United States Patent

Pasini, III et al.

[15] 3,636,751
[45] Jan. 25, 1972

[54] RADIAL FLOW CELL

[72] Inventors: Joseph Pasini, III; William K. Overbey, Jr., both of Morgantown; Franklin D. Slagle, Kingwood, all of W. Va.

[73] Assignee: The United States of America as represented by the Secretary of the Interior

[22] Filed: Sept. 1, 1970

[21] Appl. No.: 68,689

[52] U.S. Cl. .................................................73/38
[51] Int. Cl. .........................................G01n 15/08
[58] Field of Search...................................73/38

[56] References Cited

UNITED STATES PATENTS

| | | | |
|---|---|---|---|
| 3,114,256 | 12/1963 | Palmer | 73/38 |
| 3,152,471 | 10/1964 | Rahme et al. | 73/38 |
| 3,140,599 | 7/1964 | Rahme et al. | 73/38 |

Primary Examiner—S. Clement Swisher
Assistant Examiner—William A. Henry, II
Attorney—Ernest S. Cohen and Albert A. Kashinski

[57] ABSTRACT

A radial flow cell and associated method for measuring the directional permeability of a porous rock sample. While the sample is constrained in the flow cell, fluid under pressure is forced radially through it. Directional permeability is determined by comparing the relative amounts of fluid flowing out of the sample into distinct collecting areas.

4 Claims, 3 Drawing Figures

PATENTED JAN 25 1972

INVENTORS
JOSEPH PASINI, III
WILLIAM K. OVERBEY, JR.
FRANKLIN D. SLAGLE

BY *Ernest S. Cohen*
*Albert A. Kashinski*

ATTORNEYS

RADIAL FLOW CELL

BACKGROUND OF THE INVENTION

In a rock formation, permeability is a measure of fluid transmitting capacity. The more permeable the rock, the greater its capacity. Because of their structural configuration, many rocks exhibit directional permeability. They transmit more fluid in some directions than in others. Our invention is a method and apparatus for measuring this directional permeability.

Detailed analysis of rock permeability is a valuable tool for efficient extraction of oil from reservoir sandstones. Permeability characteristics of a reservoir formation determine well placement and spacing, fracturing techniques, and retorting processes. Precision directional permeability analysis enhances each of these functions, insuring maximum reservoir output without waste of effort or mineral resources.

Numerous prior art techniques are available for measuring rock permeability. A majority of these techniques are applicable only to measuring overall permeability; others are only moderately effective for measuring directional permeability. One technique employs a flood-pot that measures total radial fluid flow through a sample. No information is obtained relating to flow in distinct directions within the sample. In another technique, a pattern of parallel holes is drilled into a rock sample. Fluid is forced to flow from one hole into the others. Boundary conditions in this technique obscure the true directional characteristics of the sample. In a third technique, a series of small plugs are removed in a helical pattern from a core sample. Each plug is then individually analyzed. Disadvantages of this technique are the time taken to prepare the plugs and run individual tests on them, and the large amounts of expensive core material required. To overcome these disadvantages of the prior art, this invention was made.

SUMMARY OF THE INVENTION

This invention is a radial flow cell and associated method for measuring the directional permeability of a porous rock sample. In operation of the flow cell, fluid under pressure is injected into a hollow central chamber extending axially through a cylindrical sample. Rubber seals clamped against opposing outer surfaces of the sample prevent fluid flow in any direction but radially outward from the chamber. Flowing from the chamber to the periphery of the sample, the fluid stream encounters the same thickness of porous rock in each direction. Radial dividers in the flow cell partition the curved outer surface of the sample into distinct fluid collecting areas. From the collecting areas the fluid flows into an array of graduated collecting tubes. By comparing the amount of fluid collected in each tube, the directional permeability of the sample is determined.

Therefore, one object of this invention is a radial flow cell for measuring the directional permeability of a porous sample.

Another object of this invention is a radial flow cell having distinct fluid collecting areas, positioned to adjoin the peripheral surface of a sample.

Another object of this invention is a method for determining the directional permeability of a porous sample.

Other objects of the invention will be apparent in the following specification and drawing.

DESCRIPTION OF THE PREFERRED EMBODIMENT

Figure 1:
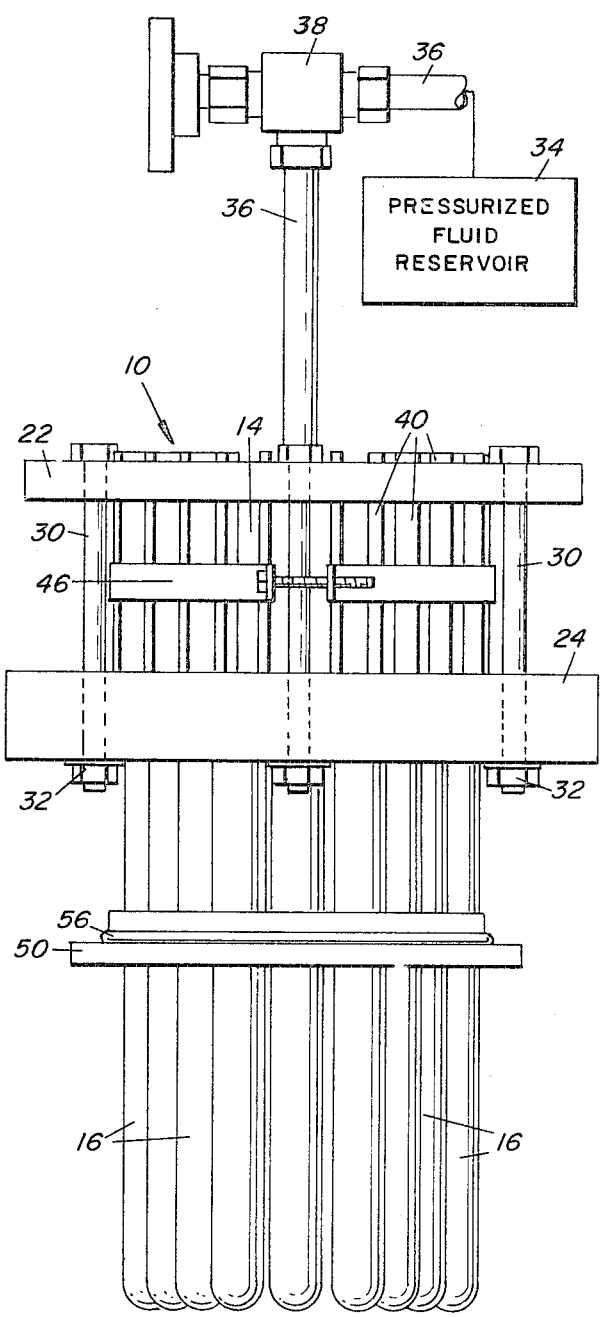
FIG. 1 is a side view of a radial flow cell.
Figure 2:
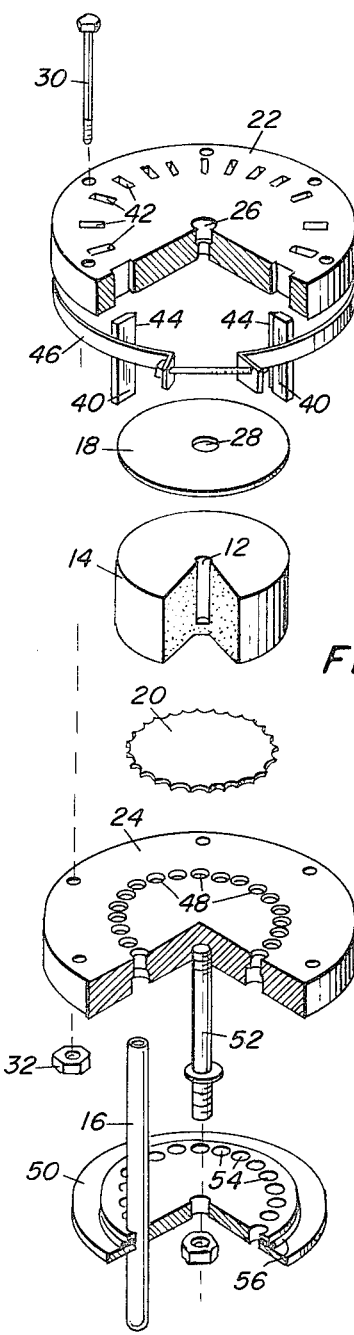
FIG. 2 is a partial exploded perspective view of the radial flow cell shown in FIG. 1.
Figure 3:
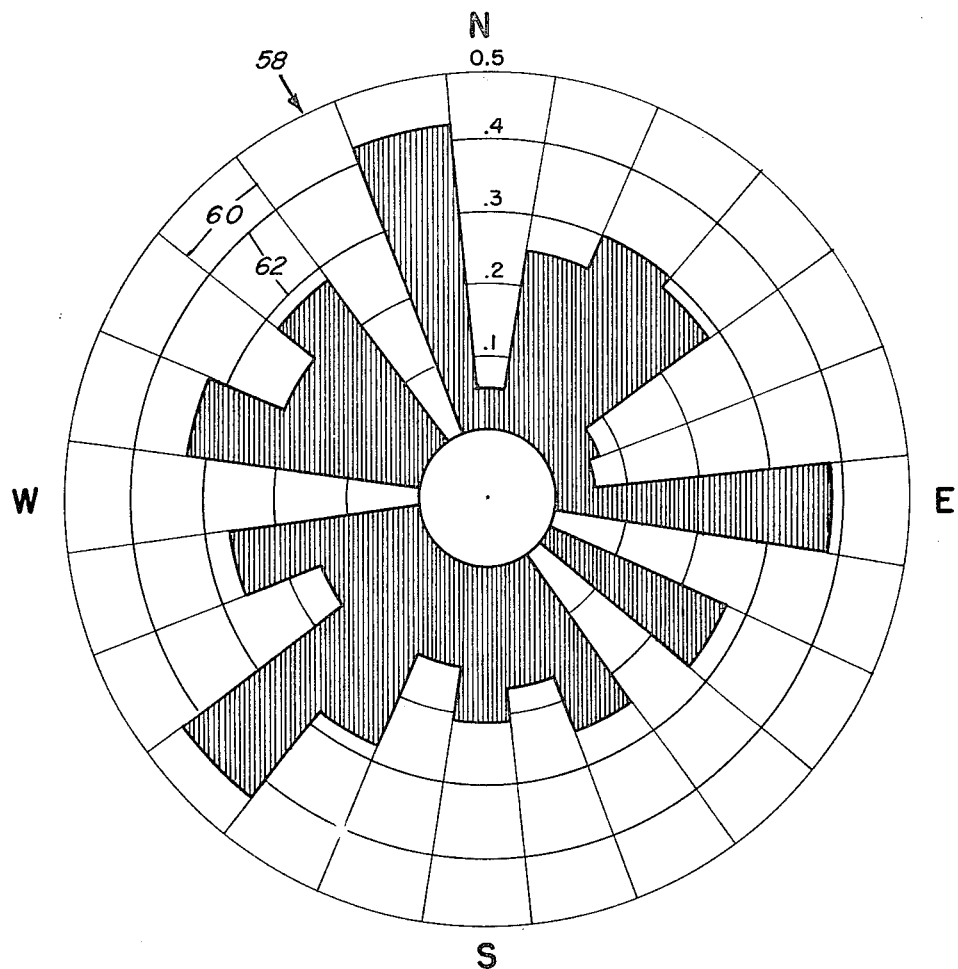
FIG. 3 is a polar graph indicating relative directional permeability in a 360° arc around the central axis of a porous sample.

A radial flow cell 10 is shown in FIGS. 1 and 2. Rock permeability tests are performed with the cell by injecting a pressurized test fluid into a hollow chamber formed by a hole 12 bored through the center of a rock sample 14, as best seen in exploded form in FIG. 2. The test fluid flows radially through the sample, and into a circular array of graduated tubes 16 situated around its periphery. Depending upon the permeability in the various radial directions, different amounts of fluid are collected in each tube. The directional permeability characteristics are recorded by plotting a polar graph 58, as shown in FIG. 3, indicating the amount of fluid collected at each location.

A rock sample 14 for testing in the radial flow cell 10 is cut from an underground formation by ordinary coring methods. The orientation of the sample core within the formation is documented so that its permeability characteristics can be extrapolated to the entire formation. After slicing a cylindrical slab from the sample core, an axial hole is bored through the center of the slab, preferably to within a short distance of rupturing the opposite end, forming a hollow central chamber in the core. The core is then air dried, evacuated, and saturated with the test fluid. Alternatively, the core is flooded with brine or cleaned with alcohol and then resaturated with the test fluid, depending upon the specific permeability characteristic undergoing examination.

After preparation, the sample core 14 is sandwiched between two neoprene gaskets 18 and 20, and clamped between a top and a bottom plate 22 and 24. In the center of top plate 22 an opening 26 communicates with hole 12 in the sample core, through a concentric opening 28 in gasket 18. When top and bottom plates 22 and 24 are clamped together by bolts 30 and nuts 32, a fluidtight seal is formed around hole 12 and the sample surface abutting gasket 18. Test fluid (not shown) from a pressurized fluid reservoir 34 is injected into the chamber within the core through high-pressure tubing 36 and an intermediate control valve 38. The test fluid fills the chamber and flows radially outward at a rate dependent upon the permeability of the sample.

In order to distinguish the quantities of test fluid flowing out of the various segments, the periphery of the sample is divided into a series of separate sections. The sections are formed by a circular array of radial dividers 40, spaced around the sample at appropriate intervals, 15° in FIGS. 1 and 2. Radial slots 42 in top plate 22 position the dividers at the selected intervals, and at the same time hold them parallel to the axis of the sample. The slots 42 are sufficiently large in their radial dimension to permit adjustment of the dividers to closely abut samples of slightly varying dimensions. To accurately define the flow boundaries between sections, the inner edge of each divider has a knifelike edge 44 abutting the periphery of the sample. An adjustable band 46 holds the dividers tightly against the sample, forming uniform 15° partitions for receiving the test fluid from each segment.

In bottom plate 24 a circular array of countersunk holes 48 is aligned with the periphery of the sample 14. Test fluid passes from the sample, through the holes, to the graduated tubes 16 positioned below the bottom plate. For each section of the sample there is one hole, preferably with a countersunk diameter approximating the spacing between adjacent dividers 40. To channel the test fluid directly into the holes, their centers are positioned closely adjacent to the periphery of the sample, with the widest part of the hole aligned with the edge of the sample. As it flows from the sample surface, the test fluid passes through each hole with minimum interference from the bottom plate. On the side of bottom plate 24 opposite their countersunk ends, holes 48 are counterbored to receive the necks of the graduated tubes. The counterbores center the tube within the holes, enabling the test fluid to flow past the rims of the tubes without interference. To further prevent interference with the flow of test fluid, while at the same time providing maximum sealing efficiency, the edge of gasket 20 is serrated to fit completely within the pattern of holes 48 in bottom plate 24.

Graduated tubes 16 are supported beneath bottom plate 24 by a tube holder 50, depending from the bottom plate on a threaded shaft 52. The tube holder is a flat disc with a circular array of holes 54, into which the graduated tubes 16 are inserted. Within holes 54, the tubes are supported by a rubber ring 56 seated in a slot in the edge of tube holder 50. The slot extends around the circumference of the tube holder, and slightly into the sidewall of each hole 54, providing a lateral friction detent at the side of each tube.

After the sample core 14 is clamped into the flow cell 10, and before the graduated tubes 16 are positioned 3 to 6 pore volumes of fluid are displaced through the core to insure complete saturation and to establish flow equilibrium. Then the graduated tubes are installed and the flowing liquid is collected. The pressure of the test fluid is controlled for a precise duration, at the end of which the volume of fluid in each tube is measured. Since all radial flow variables are the same, except for the directional permeability of the sample, the volume of fluid in each tube is directly related to the directional flow properties of the associated sample segment.

The volume of fluid in each graduated tube is plotted on a polar coordinate graph 58, as shown in FIG. 3, to visually represent the directional flow properties of the sample. Radial lines 60 divide the graph into areas representing the segments of the sample core; concentric circles 62 partition the graph to indicate volume. Compass directions are shown around the periphery of the graph, corresponding to the documented orientation of the sample core in the formation from which it was taken. In this way, the directional permeability characteristics of an underground formation are easily determined.

While this invention is described with reference to a specific preferred embodiment, alternate forms of the invention within the scope of this disclosure are to be expected. For example, the radial flow cell might be operated in an autoclave where a gas could be used to exert a back pressure on the flowing fluid and the temperature could be controlled to simulate reservoir conditions. Alternate sample shapes, with corresponding changes in the flow cell, might be used for analyzing permeability in specific directions. For this reason the scope of the invention is limited only by the following claims.

What is claimed is:

1. A method for measuring the directional permeability of a porous sample comprising:
   forming a hollow chamber in a central portion of the sample,
   injecting a fluid under pressure into the hollow chamber to cause fluid to flow from the chamber through the sample,
   sealing selected surfaces of the sample to direct the fluid flow in only those directions for which directional permeability data is sought,
   dividing the outer surface of the sample into a series of distinct fluid collecting areas to isolate the fluid flowing from different segments of the sample, and
   measuring the isolated volumes of fluid that pass through the sample into each collecting area.

2. An apparatus for measuring the directional permeability of a porous sample having a hollow central chamber comprising:
   means for injecting a fluid under pressure into the hollow central chamber to cause fluid to flow from the chamber to the outer surface of the sample,
   means for sealing selected surfaces of the sample to direct the fluid flow in only those directions for which directional permeability data is sought,
   means for dividing at least a portion of the outer surface of the sample into distinct fluid collecting areas, and
   means for measuring the volume of fluid flowing from the sample into each of the distinct fluid collecting areas.

3. An apparatus, as claimed in claim 2, for measuring the directional permeability of a porous sample having a hollow central chamber and, in addition, opposed flat outer surfaces in which:
   the means for sealing further comprises a pair of spaced plates, a pair of intermediate resilient sheets, and means for clamping the opposed flat surfaces of the sample between the flat plates and resilient sheets, and
   the means for dividing further comprises a series of flat dividers, each having a knifelike edge for abutting a selected outer surface of the sample, and means for pressing the knifelike edges of the dividers against the selected outer surface of the sample.

4. An apparatus, as claimed in claim 3, for measuring the directional permeability of a porous sample having a hollow central chamber, opposed flat outer surfaces and, in addition, a circular cross section in which:
   the means for injecting includes a source of pressurized fluid communicating with an opening through one of the spaced plates,
   one of the spaced plates includes a circular array of radial slots for positioning the series of dividers adjacent to the surface of the sample,
   one of the spaced plates includes a circular array of holes with spacing similar to that of the circular array of radial slots, and
   the means for measuring the volume of the fluid includes a circular array of collecting tubes positioned to receive fluid flowing through the circular array of holes.

* * * * *